United States Patent
Caire et al.

(10) Patent No.: US 7,722,196 B2
(45) Date of Patent: May 25, 2010

(54) PLASTIC INJECTION OF LENSES WITH OPTICAL ELEMENTS AND/OR RETROREFLECTING PRISMS THAT ARE SEPARATED FROM EACH OTHER

(75) Inventors: Bernard Caire, Montreal (CA); George Iatan, St-Lambert (CA)

(73) Assignee: DBM Reflex Enterprises Inc., Laval, Quebec (CA)

( * ) Notice: Subject to any disclaimer, the term of this patent is extended or adjusted under 35 U.S.C. 154(b) by 108 days.

(21) Appl. No.: 11/777,847

(22) Filed: Jul. 13, 2007

(65) Prior Publication Data
US 2008/0088926 A1 Apr. 17, 2008

(30) Foreign Application Priority Data
Jul. 14, 2006 (CA) .................................. 2552023

(51) Int. Cl.
G02B 5/122 (2006.01)
(52) U.S. Cl. ........................................ 359/529; 264/1.9
(58) Field of Classification Search ................. 359/529, 359/530, 528, 531–533, 831, 833; 264/1.7, 264/1.9
See application file for complete search history.

(56) References Cited

U.S. PATENT DOCUMENTS

| 5,223,275 A | 6/1993 | Gellert |
| 5,275,764 A | 1/1994 | Hettinga |
| 5,494,615 A * | 2/1996 | Wang Lee ..................... 264/1.7 |
| 6,395,201 B1 * | 5/2002 | Hunt et al. .................... 264/1.9 |
| 2005/0003159 A1 | 1/2005 | Ikeda et al. |

FOREIGN PATENT DOCUMENTS

| CA | 2457266 | 8/2005 |
| WO | WO 01/16907 A1 | 3/2001 |
| WO | WO 2005/042225 A2 | 5/2005 |

* cited by examiner

*Primary Examiner*—Euncha P Cherry
(74) *Attorney, Agent, or Firm*—Merchant & Gould P.C.

(57) ABSTRACT

A moulding process to manufacture a moulded piece having multiple individual optical elements with the same or different dimensions. This is achieved by using a multicolour injection process as well as a multidrop injection manifold. In the first step, the optical elements are moulded without any junction between them. In the second step, a layer of plastic is moulded in order to join together all the optical elements to create a single piece. The moulded piece thus consists of two plastic injections with optical elements which is more easily adaptable to a variety of different designs for lights having two or more colors. New styles of optical elements, along with varied and original geometric arrangements can thus be imagined. Furthermore, signaling functions having by their regulations different colors can heretofore be placed within a same zone of glass.

9 Claims, 7 Drawing Sheets

STATION N° 1 ( FIRST INJECTION )

STATION N° 2 ( SECOND INJECTION )

SECTION A - A

3 REFLECTIVE FACES

FIRST MATERIAL (COLOUR)   SECOND MATERIAL (COLOUR)

HEXAGONAL

RECTANGLE

TRIANGLE $E_1 = E_2$

FIRST STATION

SECOND STATION $E_2 > E_1$

STATION N° 1 (FIRST INJECTION)

STATION N° 2 (SECOND INJECTION)

PLASTIC INJECTION OF LENSES WITH OPTICAL ELEMENTS AND/OR RETROREFLECTING PRISMS THAT ARE SEPARATED FROM EACH OTHER

FIELD OF THE INVENTION

The present invention is directed to a process for plastic injection of optical elements or retroreflecting prisms permitting the manufacture of different styles of lenses, particularly for tail lamps on vehicles.

BACKGROUND OF THE INVENTION

Tail lamps on vehicles have essentially a warning function, either when the vehicle is in movement or stopped. In addition, tail lamps also have a seduction function towards potential purchasers. Indeed, the aesthetics, shapes and colors proposed by designers play an important role in the commercial success of a particular vehicle. Auto makers and their research teams are thus eager for new technologies enabling them to create new styles for these tail lamps.

Interior and exterior glasses (here the term glass is used to denote the transparent or translucid material which forms part of the retroreflector, although it is not necessarily made of actual glass but may be manufactured from plastic) of the vehicle tail lights generally present at their surface optical elements. These optical elements redirect in a particular direction the light emitted by a light source which can be a bulb or LED. These optical elements are used for each of the functions of a vehicle, i.e., stop, back up, turn signal, tail lamps and fog lamps, and must meet the local regulations of the country in which the vehicle is to be commercialized.

Figure 1:
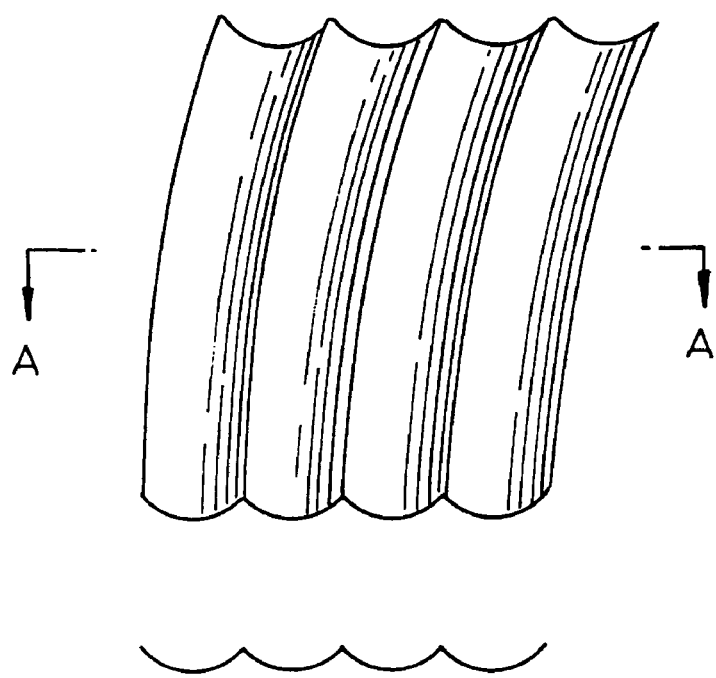
Figure 1:
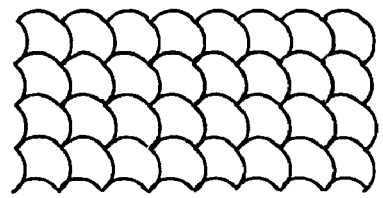
Figure 1:
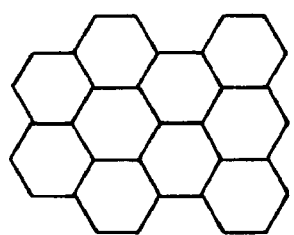

These optical elements can take the shape of flute optics, small sized motifs or patterns that are juxtaposed and repeated many times, or any other geometry susceptible to deviate the path of a light ray in a particular direction (see FIG. 1).

These optical elements can be present on the exterior surface of the glass but also within glasses, closer to the light source. In such a case, reference will thus be made to lenses.

The materials used to mould these pieces are principally amorphous transparent plastics of the PMMA or PC type that are transformed by injection moulding. An injection mould is specifically designed for their production. The moulding of the optical elements is realized with the presence of one or more metallic inserts positioned within the mould cavity. These metallic inserts present a negative form of the optical element to be reproduced with a surface mirror.

It is also frequent in the fabrication of tail light manufacturing that multicolour moulds be used. The advantage of this process over monochromatic injection is the obtention in one single step of a polychromatic glass. Thus, on a same glass, signalling functions requiring different colors can be regrouped in a single piece.

Also, during the night, stopped vehicles are rendered visible to drivers of other vehicles due to the reflection of light. These light reflectors, the design of which is based on the principle of retroreflection within the catadioptric plastic prisms, are mandatory and the light signal is normalized. These plastic reflectors are formed from prisms having dimensions varying between 2 and 10 mm per side placed on the surface of the designated reflective zone.

A person skilled in the art will readily recognize that the manufacturing of a plastic reflector necessitates many fabrication steps. The manufacturing by plastic injection moulding on a matrix usually called electroform requires the realisation of metal prisms. The prisms are manufactured from metallic shafts or rods having a specific geometry, for example hexagonal. On these rods, three angled faces called reflection faces are machined, whose surface must have mirror properties. The angles of these faces are optimized in order to respond as much as possible to automobile lighting regulations. The dimension of these hexagonal prisms, most often, varies from 2 to 4 mm per side. Above 4 mm, these prisms are considered as large prisms. Once these prisms are manufactured, they are assembled with one another with junctions between them according to a given geometry dictated by the form of the signal lamp. Non reflecting optical elements may be inserted between the prisms. Once this assembly is realized, it is placed in an electrodeposition bath in order to obtain the negative of the assembled geometric form. This negative piece is called the electroform. It is the electroform that is placed in the injection mould. The role of the electroform is to permit to the plastic that will fill the mould to take the geometric shape of the assembly of the retroreflecting prisms obtained in the previous steps. Since the injected plastic is transparent (PMMA or polycarbonate), it permits light to travel within it and thus enables the faces of the prisms to reflect the light in the inverse direction.

In order to simplify the description of the present invention, optical elements includes optics and retroreflecting prisms described above.

SUMMARY OF THE INVENTION

The present invention essentially consists in a moulding process that allows obtaining a moulded piece having multiple individual optical elements with the same or different dimensions. This is achieved by using a multicolour injection process as well as a multidrop injection manifold. In the first step, the optical elements are moulded without any junction between them. In the second step, a layer of plastic is moulded in order to join together all the optical elements to create a single piece.

The present invention, consisting of two plastic injections to create a moulded piece with optical elements, is thus more easily adaptable to a variety of different designs for lights having two or more colours.

The present invention thus enables the creation of new styles of optical elements. Varied and original geometric arrangements can thus be imagined. A plain light surface can then by realized to provide an illusion of a rugged appearance. Furthermore, signalling functions having by their regulations different colours can heretofor be placed within a same zone of glass.

The principle of retroreflection prisms is, in automobile signalling, most usually associated with hexagonal or rectangular prisms. However, the present invention is not limited to such prisms but to any geometrical form cut out in retroreflective prisms whose principle relies on the total internal reflection in plastic of three angled faces (see FIG. 4).

In accordance with a preferred embodiment of the present invention, the invention concerns a process for the manufacture of a moulded piece comprising multiple optical elements comprising:

a) providing a mould for said moulded piece;
    b) providing a plurality of optic flutes within said mould, each optic being shaped and sized to permit the moulding of an optical element, each of said optic element being mechanically separated from each other and arranged to form a predetermined pattern;
    b) injecting a plastic of a first color into each of said optic flutes in order to mould said optical elements;

c) injecting a plastic of a second color into said mould in order to complete said moulded piece.

The present invention as well as its numerous advantages will be better understood by reading the description of the preferred embodiment thereof made in reference to the following drawings.

BRIEF DESCRIPTION OF THE DRAWINGS OF THE PRESENT INVENTION

FIG. 1: Example of the optical geometric elements applicable to the process according to the present invention.

Figure 2:
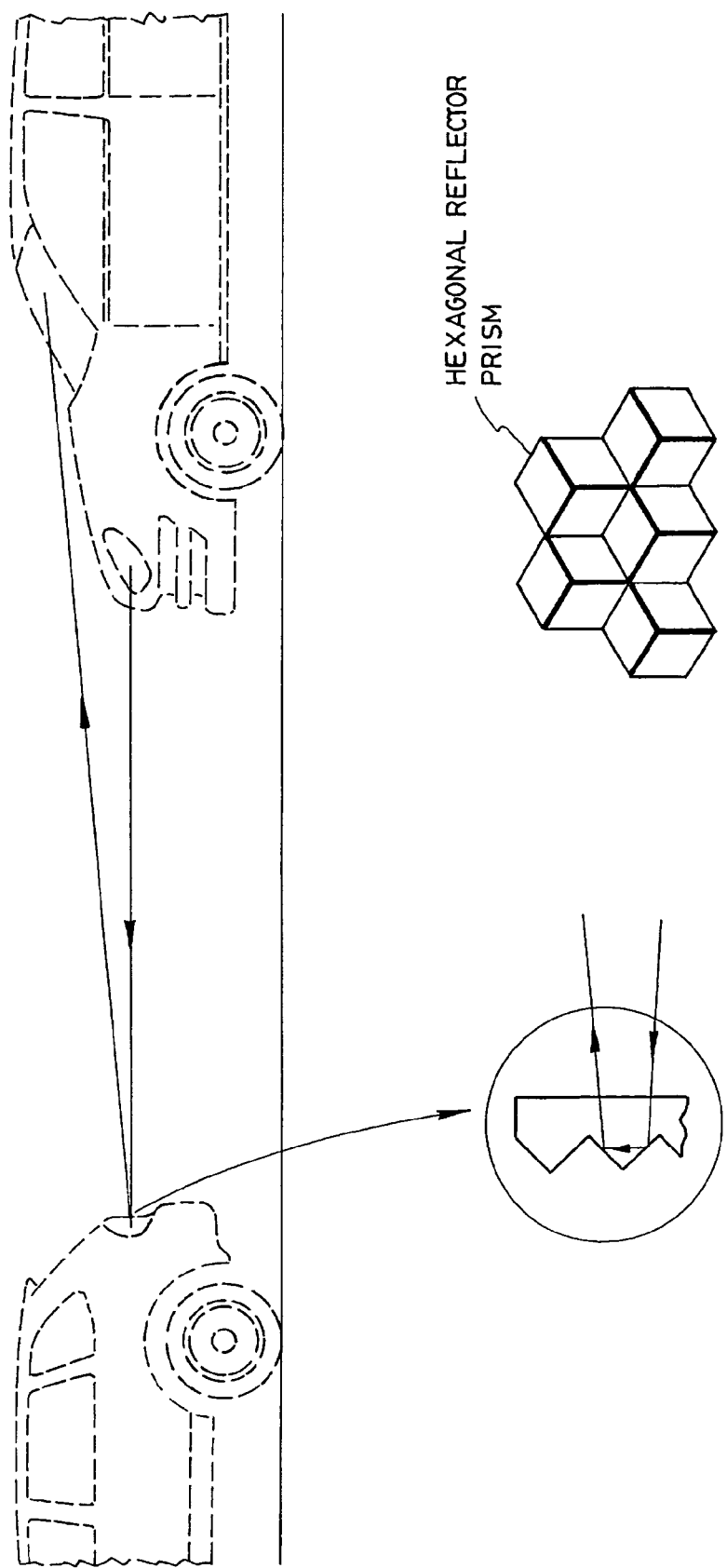

FIG. 2: Principle retroreflective light by hexagonal prisms on an automobile vehicle.

Figure 3:
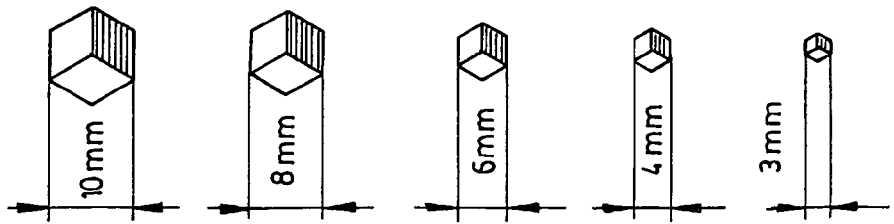
Figure 3:
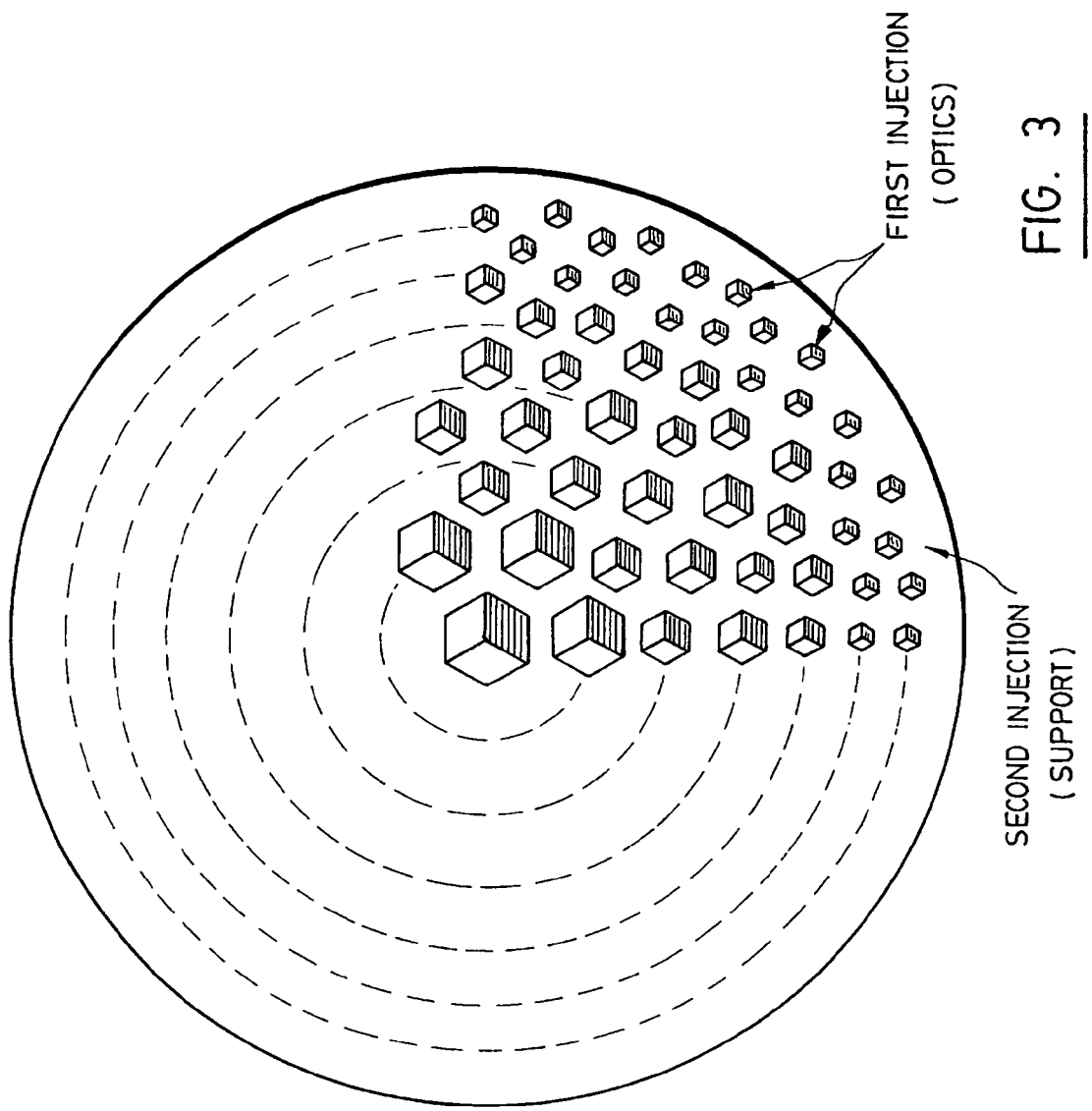

FIG. 3: Example of a particular design which can be obtained with the process according to the present invention. The optical elements present no direct physical junction between them.

Figure 4:
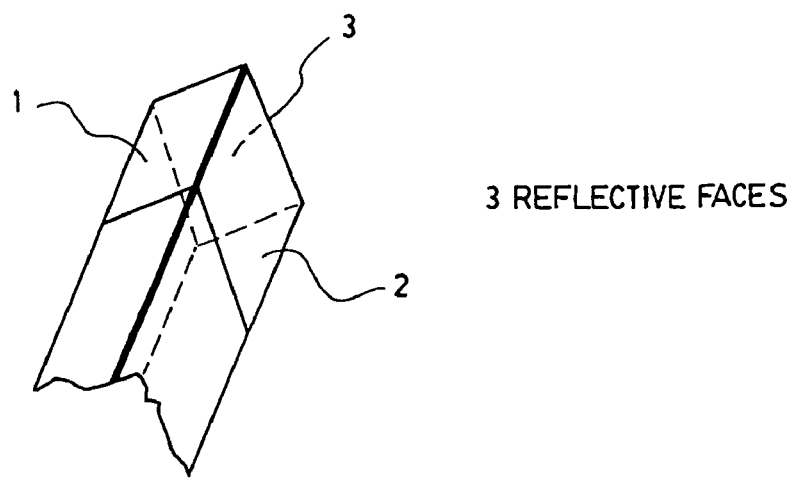

FIG. 4: Perspective view of an hexagonal reflecting prism which can be used with the process of the present invention.

Figure 5:
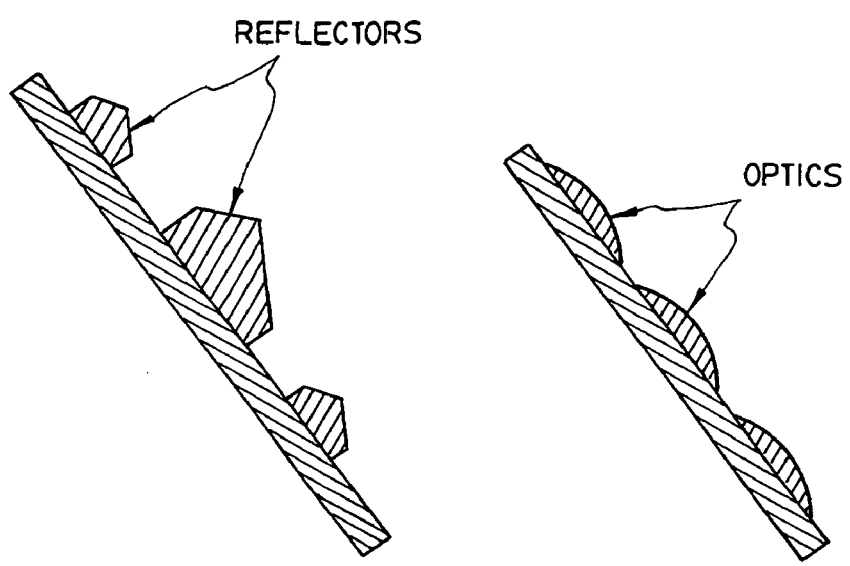
Figure 5:
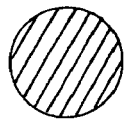
Figure 5:
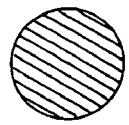

FIG. 5: Views of pieces obtained by the process of the present invention.

Figure 6:
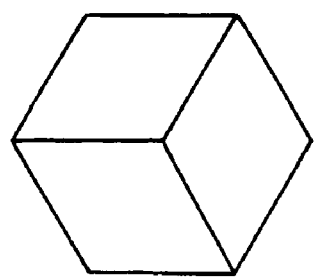
Figure 6:
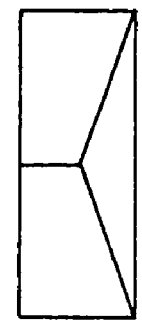
Figure 6:
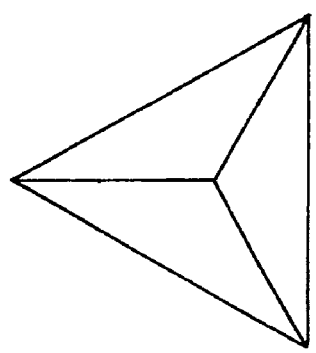

FIG. 6: Perspective views of different shapes of reflecting prisms which can be used with the process of the present invention.

Figure 7:
Figure 7:
Figure 7:
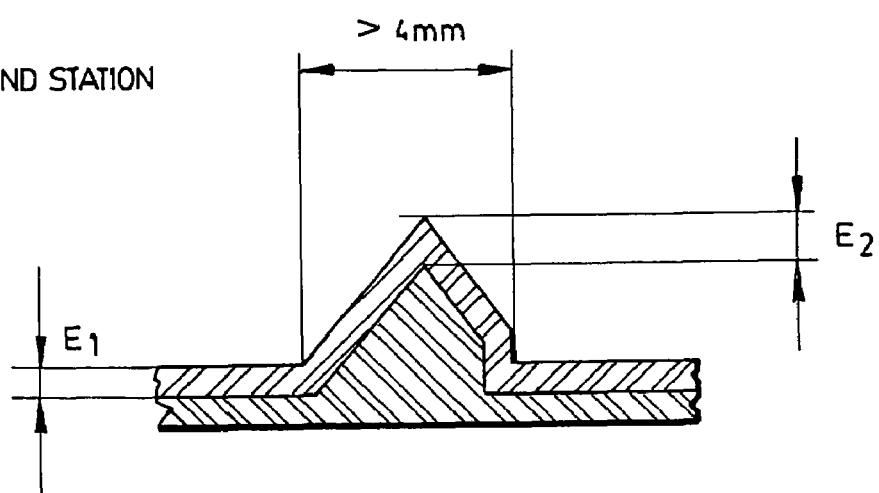

FIG. 7: Practical application of the process of the present invention to prisms of large dimensions.

Figure 8:
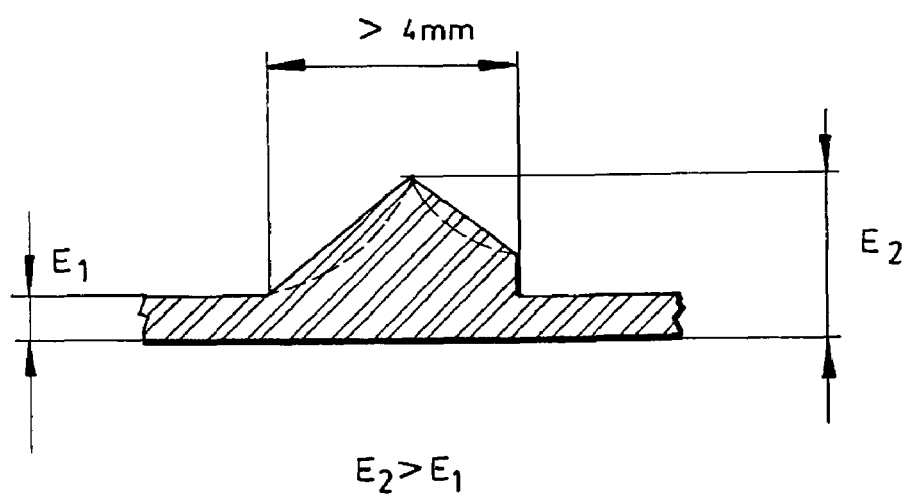

FIG. 8: Schematic representation of the phenomenon of contraction cavity.

Figure 9A:
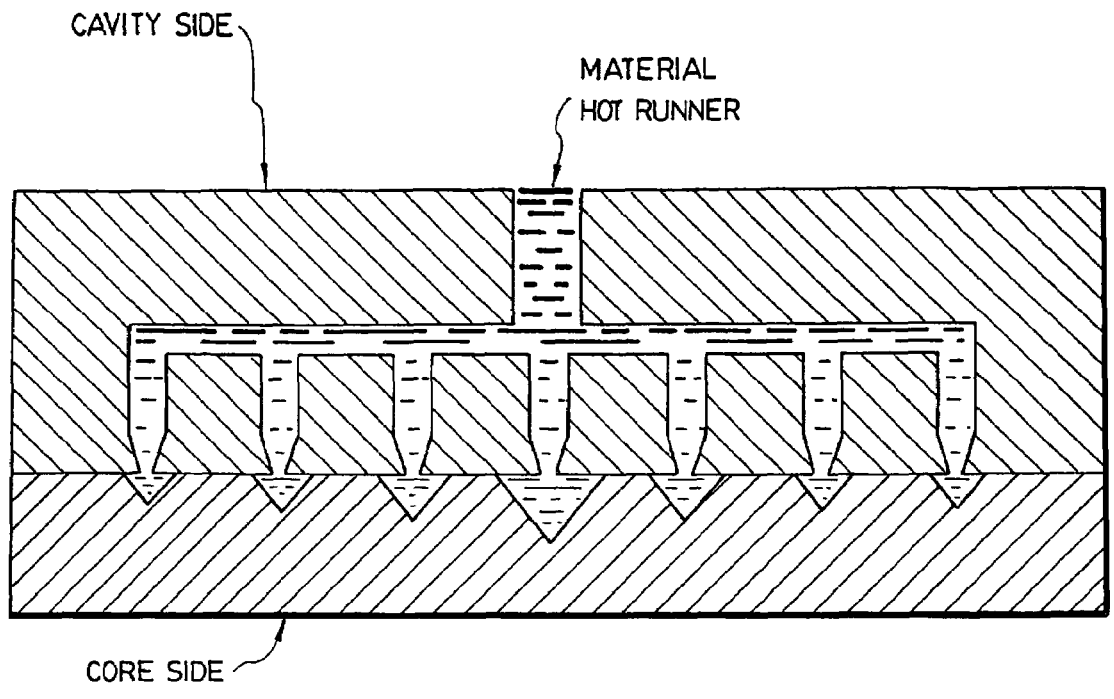
Figure 9B:
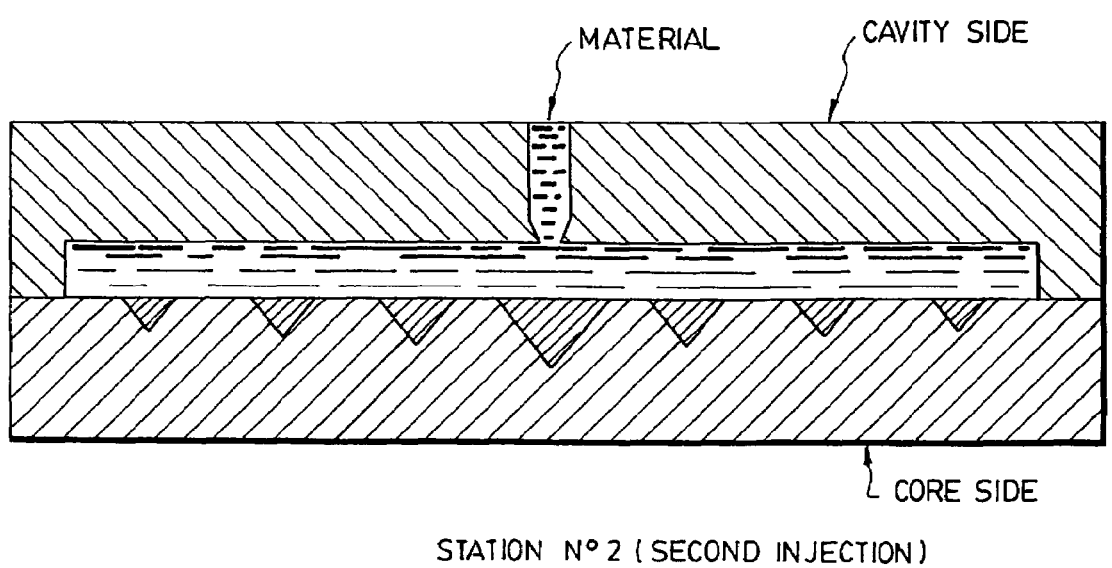

FIGS. 9A and 9B are schematic representations of moulds for carrying out the process according to a preferred embodiment of the invention.

DESCRIPTION OF THE PREFERRED EMBODIMENT OF THE INVENTION

The process according to the present invention decomposes the injection of the glass with optical elements in two successive injections. A bi-injection press is preferable for an industrial application of the process; however two tandem presses can be used if the cycle time is not a constraint of the user.

Referring now to FIGS. 9A and 9B, the first injection consists in the individual moulding of the optical elements without any physical junction or liaison between them. They are individually isolated form each other in their cavity. This process requires an independent feeding system for each optical element. The mould has a particular design with as many injection points as optical elements. Once this first injection is completed, the cavity with its moulded optical elements is mechanically transferred to a second station. In the case of a bi-injection, the transfer is effected in the same mould by internal rotation of the cores. In the case of a tandem press, an operator or a robot is tasked with transferring the cavity from the first press to the second press. The cavity which is now placed, precedes the second injection. The second injection has as its goal the creation of a plastic layer of a few millimeters in thickness which supports and physically joins together the optical elements (see FIG. 5). At the interface between the two materials, mechanical-type physical liaisons are created.

The second injection requires a plastic material of a different colour from that of the optical elements, otherwise the process would have little or no interest. The resulting of the process is to obtain a single polychromatic piece having optical elements that are not juxtaposed or not joined together.

One may also contemplate the use of two different plastics (i.e. having difference chemical or physical properties) but if such is the case, they must be compatible with each other.

The different colours between the plastics used procure to the glass a visual appearance and aesthetic that is novel. In one preferred object of the process according to the present invention is to encourage the use of optical elements having a variety of different sizes on automobile and other vehicles' lenses. Designers can now use arrangements or layout of non-juxtaposed optical elements with the goal to achieve more varied and original styles than those presently available, the latter being by their method of manufacture a simple juxtaposition of optical elements.

Preferably, the process according to the present invention concerns plastic injection of optical elements and retroreflectors principally used in light signalling, but can be used in other fields of application.

In the case of reflecting prisms, the process according to the present invention can be used to inject prisms of different shapes, as better shown in FIG. 6. One of the distinct advantages of the present invention is that, contrary to conventional injection which is performed in one step, the process includes two injection steps which provides a better control of the geometry of the first station and permits the moulding of large prisms (greater than 4 mm) all the while minimizing contraction cavities of the reflection surfaces. For prisms smaller than 4 mm, the phenomena of contraction cavities that the present invention minimizes is otherwise negligible.

One will appreciate that the present invention is not limited to bi-injection, but can be extended to three or more steps based on the principle stated above.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention as defined in the appended claims.

The invention claimed is:

1. A process for the manufacture of a moulded piece comprising multiple optical elements located on a support, said process comprising:
   a) providing a single mould for said moulded piece;
   b) providing a plurality of optic flutes within said mould, each of said optic flutes being shaped and sized to permit injection moulding of an optical element, each of said optic elements being mechanically separated from each other and arranged to form a predetermined pattern;
   c) injecting a plastic of a first color into each of said optic flutes in order to mould said optical elements;
   d) keeping said moulded optical elements in their mould;
   e) injecting a plastic of a second color into said mould to form the support and to complete said moulded piece.

2. A process according to claim 1, wherein said step c) is effected in a first station and said step e) is effected in a second station of a same press.

3. A process according to claim 1, wherein within said step b), each of said optic flutes is provided with an individual injection element.

4. A process according to claim 1, wherein said plastics of steps c) and e) have a same chemical composition.

5. A process according to claim 1, wherein said plastics of steps c) and e) have a different chemical composition.

6. A moulded piece comprising:
   a plurality of optical elements, each of said optical elements being individually moulded and being mechanically separated from each other and arranged to form a predetermined pattern, said optical elements being of a first color;

a layer of translucent material, said translucent material being of a second color, said translucent material being moulded around said optical elements in order to support and bind the optical elements within said layer, said layer of translucent material being shaped and sized to conform to said moulded piece.

7. A piece according to claim 6 wherein each of said optical elements has a same shape and size.

8. A piece according to claim 6, wherein said optical elements have the same shape but at least two of said optical elements have different sizes.

9. A piece according to claim 6, wherein said piece is a retroreflector element for a taillight of a vehicle.

* * * * *